(12) United States Patent
Wang et al.

(10) Patent No.: US 10,798,794 B2
(45) Date of Patent: Oct. 6, 2020

(54) LED LIGHTING ASSEMBLY AND DRIVE CIRCUIT

(71) Applicant: Current Lighting Solutions, LLC, East Cleveland, OH (US)

(72) Inventors: Dazhen Wang, Xian (CN); Dengfeng He, Xian (CN); Qiang Zou, Xian (CN); Zhichao Liu, Shanghai (CN); Junhua Huang, Shanghai (CN); Junxian Chu, Xian (CN)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 16/188,344

(22) Filed: Nov. 13, 2018

(65) Prior Publication Data
US 2019/0200426 A1  Jun. 27, 2019

(51) Int. Cl.
*H05B 45/00* (2020.01)
*H05B 45/37* (2020.01)
*F21K 9/278* (2016.01)
*H05B 45/10* (2020.01)
*H05B 45/40* (2020.01)

(52) U.S. Cl.
CPC ............. *H05B 45/37* (2020.01); *F21K 9/278* (2016.08); *H05B 45/00* (2020.01); *H05B 45/10* (2020.01); *H05B 45/40* (2020.01)

(58) Field of Classification Search
CPC ............ H05B 37/02; H05B 37/0227; H05B 37/0272; H05B 33/08; H05B 33/0812; H05B 33/0815; H05B 33/0842; H05B 33/0845; H05B 33/0854; H05B 45/00; H05B 45/10; H05B 45/37; H05B 45/40; F21K 9/278
See application file for complete search history.

(56) References Cited

U.S. PATENT DOCUMENTS

| 8,664,892 | B2 | 3/2014 | Radermacher |
| 9,398,650 | B2 | 7/2016 | Choi et al. |
| 9,419,537 | B1 | 8/2016 | Haas et al. |
| 2012/0313540 | A1* | 12/2012 | Lin .................... H05B 33/0884 315/201 |

(Continued)

FOREIGN PATENT DOCUMENTS

| WO | 2014115010 A1 | 12/2013 |
| WO | 2016112538 A1 | 7/2015 |

*Primary Examiner* — Jimmy T Vu
(74) *Attorney, Agent, or Firm* — Buckley, Maschoff & Talwalkar LLC

(57) ABSTRACT

The present invention discloses an LED lighting assembly configured to retrofit a fluorescent tube, comprising at least one LED, and a driving circuit configured to drive the at least one LED. The driving circuit comprises a switch control module and a rectifying circuit. The driving circuit is connected to the at least one LED and configured to receive and process an AC voltage signal from one side or both sides of the LED lighting assembly, and control the driving of the at least one LED based on the processed voltage signal. The rectifying circuit is connected to the at least one LED and configured to convert an AC power inputted to the rectifying circuit into a DC power supplied to the at least one LED. The present invention also discloses an LED driving circuit configured to retrofit a fluorescent tube.

10 Claims, 5 Drawing Sheets

(56) References Cited

U.S. PATENT DOCUMENTS

2014/0152184 A1\* 6/2014 Tomiyama ............. H05B 45/37
                                                      315/186
2016/0327216 A1   11/2016 Gielen et al.
2017/0038012 A1\* 2/2017 Jiang ..................... H05B 6/105

\* cited by examiner

LED LIGHTING ASSEMBLY AND DRIVE CIRCUIT

TECHNICAL FIELD

The present invention generally relates to the field of illumination, and more particularly to an LED lighting assembly and a driving circuit thereof.

BACKGROUND

Light-emitting diode (LED) light source has received extensive attention and has been widely used due to its small size, low power consumption and long service life. It has become a trend to replace the traditional fluorescent lamp with LED tube.

With existing technology, replacing the traditional fluorescent tube with the LED tube usually requires removal of the original ballast. This method requires modification of the internal wiring of the lamp, thus high labor costs are incurred. However, if the original ballast is not removed, and if only the original fluorescent tube is replaced by an LED tube, then at times the ballast is incompatible and the LED tube cannot work as usual.

Therefore, in view of this, how to make it compatible with ballasts when replacing fluorescent lamps is becoming more and more urgent.

SUMMARY

One aspect of the present invention is to provide an LED lighting assembly. The LED lighting assembly comprises at least one LED and a driving circuit a driving circuit configured to drive the at least one LED. The driving circuit comprises a switch control module and a rectifying circuit. The driving circuit is connected to the at least one LED and configured to receive and process an AC voltage signal from one side or both sides of the LED lighting assembly, and control the driving of the at least one LED based on a processed voltage signal. The rectifying circuit is connected to the at least one LED and configured to convert an AC power inputted to the rectifying circuit into a DC power supplied to the at least one LED.

Another aspect of the present invention is to provide an LED driving circuit. The LED driving circuit comprises a switch control module and a rectifying circuit. The driving circuit is connected to the at least one LED and configured to receive and process an AC voltage signal from one or both sides of the LED lighting assembly, and control the driving of the at least one LED based on a processed voltage signal. The rectifying circuit is connected to the at least one LED and configured to convert an AC power inputted to the rectifying circuit into a DC power supplied to the at least one LED.

BRIEF DESCRIPTION OF DRAWINGS

These and other features, aspects and advantages of the present invention will become better understood when the following detailed description is read with reference to the accompanying drawings, in which like reference numerals are used throughout the drawings to refer to like parts, where.

DETAILED DESCRIPTION OF EMBODIMENTS

Figure 1:
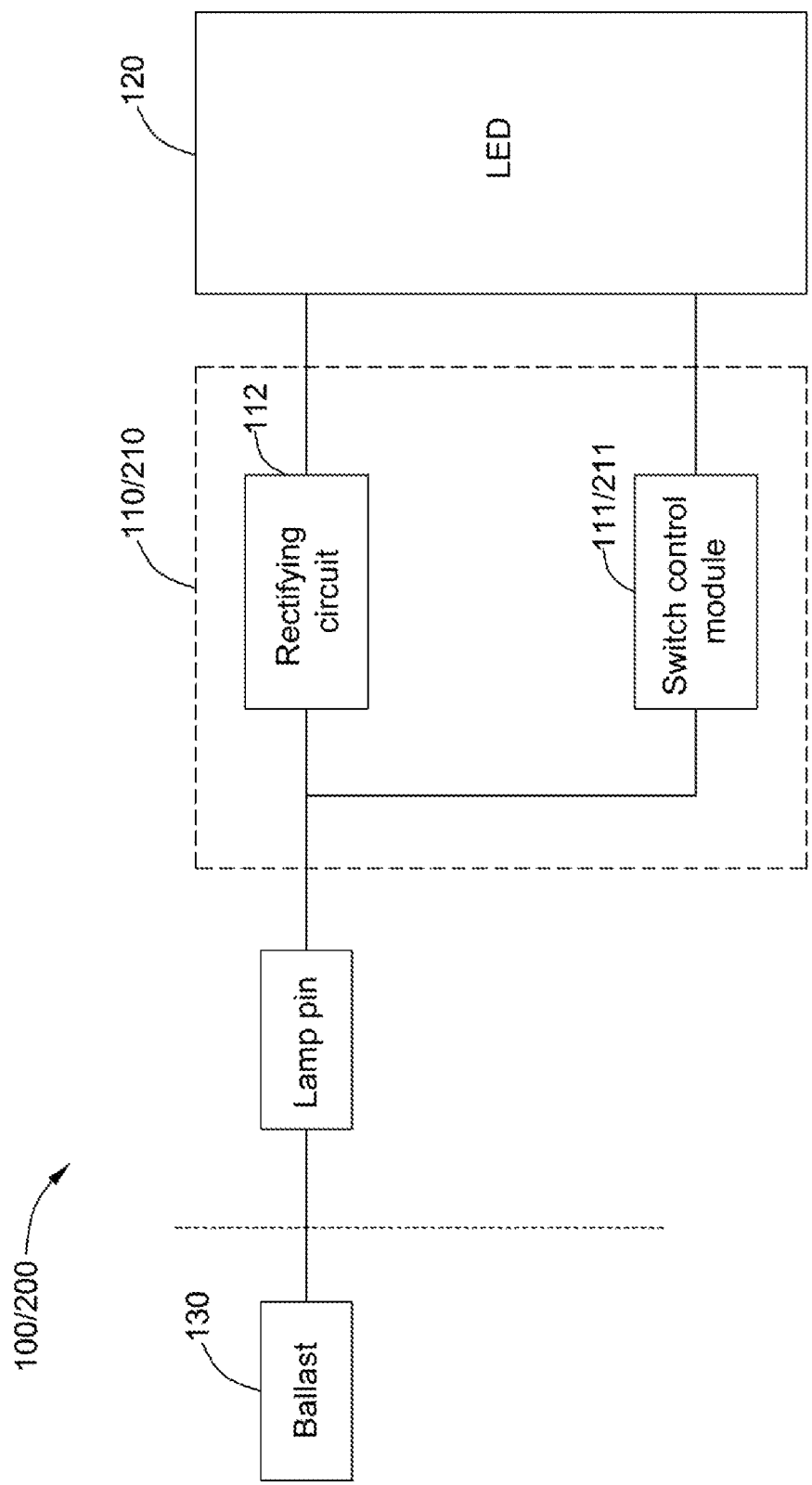
FIG. 1 is a general schematic block diagram of an LED lighting assembly according to the first and second embodiments of the present invention.

The embodiments of the present invention will be described below in detail with reference to the accompanying drawings in order to facilitate those skilled in the art to exactly understand the subject matter claimed by the present invention. In the following detailed description of these specific embodiments, the present specification does not describe in detail any of the known functions or configurations, to avoid unnecessary details that may affect the disclosure of the present invention.

Unless otherwise defined, the technical and scientific terms used in the claims and the specification are as they are usually understood by those skilled in the art to which the present invention pertains. "First", "second" and similar words used in the specification and the claims do not denote any order, quantity or importance, but are merely intended to distinguish between different constituents. The terms "one", "a" and similar words are not meant to be limiting, but rather denote the presence of at least one. "Comprising", "consisting of" and similar words mean that the elements or articles appearing before "comprising" or "consisting of" include the elements or articles and their equivalent elements appearing behind "comprising" or "consisting of", not excluding any other elements or articles. "Connected", "coupled" and similar words are not restricted to physical or mechanical connections, but may also include electrical connections, whether direct or indirect. Further, terms indicating a specific position, such as "top", "bottom", "left", "right", and the like are merely descriptions made with reference to specific drawings. Each embodiment disclosed herein may be placed in different ways as illustrated in the drawings of the present invention. Therefore, the positional terms used herein should not be limited to the positions shown in the specific embodiments.

Figure 2:
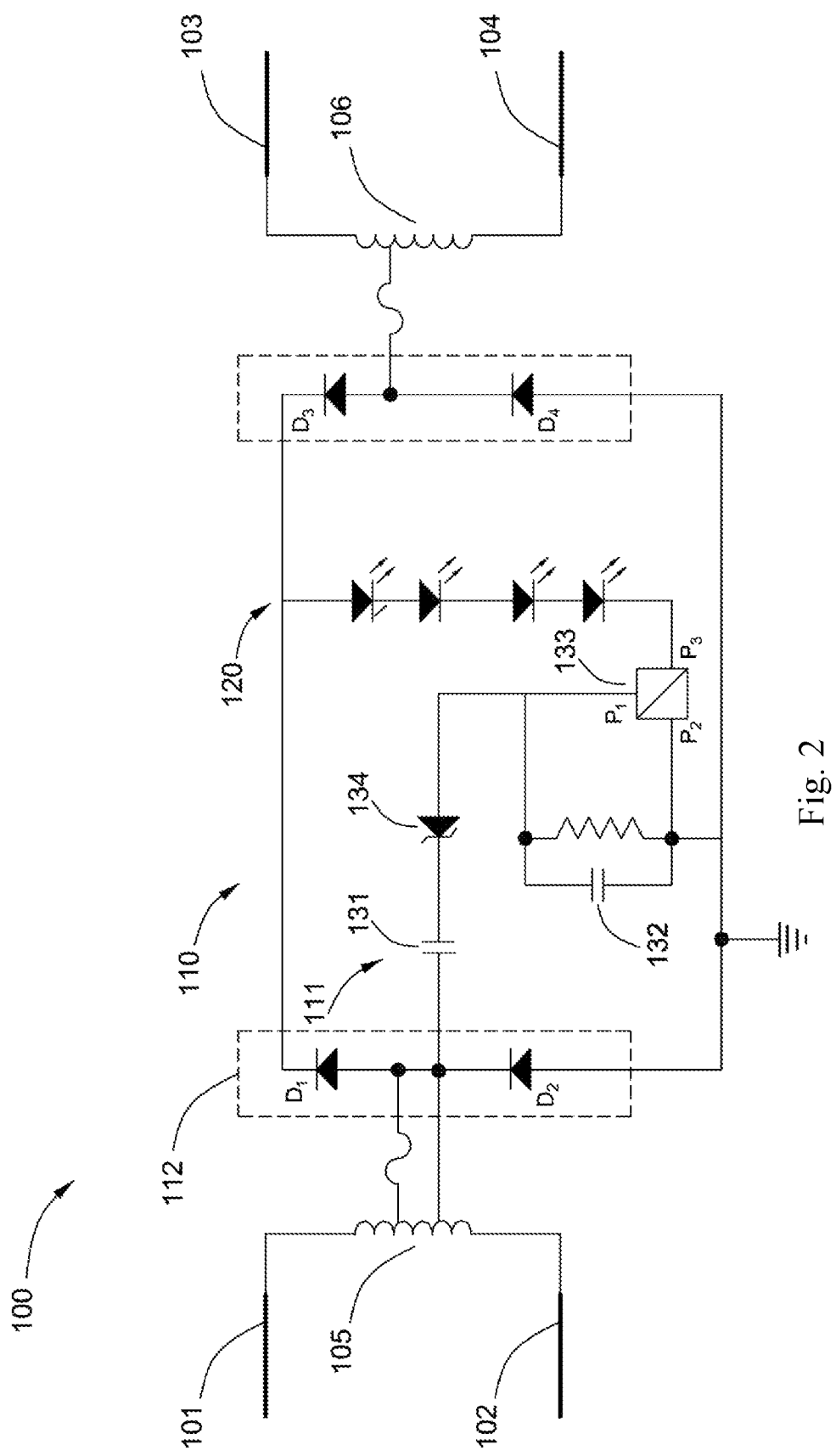
FIG. 2 is a schematic circuit diagram of the LED lighting assembly of the first embodiment of FIG. 1.

FIG. 1 shows a general schematic block diagram of an LED lighting assembly 100/200 according to the first and second embodiments of the present invention, and FIG. 2 shows a schematic circuit diagram of the LED lighting assembly 100 of the first embodiment of FIG. 1. Referring to FIGS. 1-2, the LED lighting assembly comprises at least one LED 120 and a driving circuit 110, wherein the driving circuit 110 comprises a switch control module 111 and a rectifying circuit 112.

The LED lighting assembly 100 further comprises lamp pins 101 and 102 on one side of the lighting assembly 100, and a first impedance element 105 connected between the lamp pins 101 and 102; and lamp pins 103 and 104 on the other side of the lighting assembly 100, and a second impedance element 106 connected between the lamp pins 103 and 104, wherein the first impedance element 105 and the second impedance element 106 are used to simulate the filament of the fluorescent tube. The ballast 130 is connected to one of the lamp pins.

The switch control module 111 is connected between the lamp pins on both sides of the lighting assembly 100 for receiving and processing voltage signals, and controls the operation of driving the at least one LED based on the processed voltage signals. Preferably, the switch control module 111 is connected between the first impedance element 105 and the second impedance element 106 for receiving and processing the voltage signals. The switch control module 111 further comprises a third impedance element 131, an integral element 132, and a switch element 133. The third impedance element 131 has one end connected to the first impedance element 105 and the other end connected to the $P_1$ terminal of the switch element 133. One end of the integral element 132 is connected to the $P_1$ terminal of the switch element 133, and the other end is connected to the $P_2$ terminal of the switch element 133. The $P_2$ terminal of the switch element 133 is connected to the second impedance element 106, and the $P_3$ terminal of the switch element 133 is connected to the negative terminal of the LED 120. In another embodiment, the switch element 133 can also be coupled to the positive terminal of the LED 120, and the rectifying circuit 112 can be coupled to the negative terminal of the LED 120. In one embodiment, the switch element 133 can be any one of a Silicon Controlled Rectifier (SCR), a relay, a thyristor, a field effect transistor, or a conventional switch. The third impedance element 131 can receive the voltage signal and generate a pre-processed voltage signal. The integral element 132 can integrate the pre-processed voltage signal and supply a processed voltage signal to the switch element 133. The switch element 133 has a first threshold; when the processed voltage signal supplied by the integral element 132 is greater than the first threshold of the switch element, the switch element 133 is turned on, the path of the LED 120 is closed, and the LED 120 operates.

In one embodiment, the third impedance element 131 is a resistor that can step down the voltage signal and generate a step-down signal, and the step-down signal is a pre-processed voltage signal. In another embodiment, the third impedance element 131 is a capacitor or an inductor, and the capacitor or the inductor can perform a frequency operation on the voltage signal, pass the high frequency portion of the voltage signal, and generate a high frequency voltage signal, whereby the high frequency voltage signal is a pre-processed voltage signal.

In an alternative embodiment, the switch control module 111 further comprises a Zener diode 134, having a cathode connected to the third impedance element 131 and an anode connected to the $P_1$ terminal of the switch element 133. The Zener diode 134 comprises a second threshold; when the pre-processed voltage signal generated by the third impedance element 131 is greater than the second threshold, the Zener diode has a reverse breakdown, and the integral element 132 begins to integrate the pre-processed voltage signal and supplies the processed voltage signal to the switch element 133. In one embodiment, the second threshold is the breakdown voltage of the Zener diode 134. The Zener diode 134 acts as protection for the circuit to prevent a suddenly increasing voltage signal from damaging the circuit.

The rectifying circuit 112 is coupled to the LED 120 to convert the AC from the first impedance element 105 and the second impedance element 106 on both sides of the LED lighting assembly 100 to the DC that is supplied to the LED 120. The rectifying circuit 112 comprises four diodes: $D_1$, $D_2$, $D_3$, and $D_4$. Whereby the junction between the anode of the diode $D_1$ and the cathode of the diode $D_2$ is connected to the first impedance element 105; the junction between the anode of the diode $D_3$ and the cathode of the diode $D_4$ is connected to the second impedance element 106; the cathode of the diode $D_1$ and the cathode of the diode $D_3$ are connected to the positive terminal of the LED 120; the anode of diode $D_2$ and the anode of the diode $D_4$ are connected to ground. Alternatively, the junction between the anode $D_1$ and the cathode of the diode $D_2$ is connected to the first impedance element 105 through a fuse, while the junction between the anode of the diode $D_3$ and the cathode of the diode $D_4$ is connected to the second impedance element 106 through a fuse.

Figure 3:
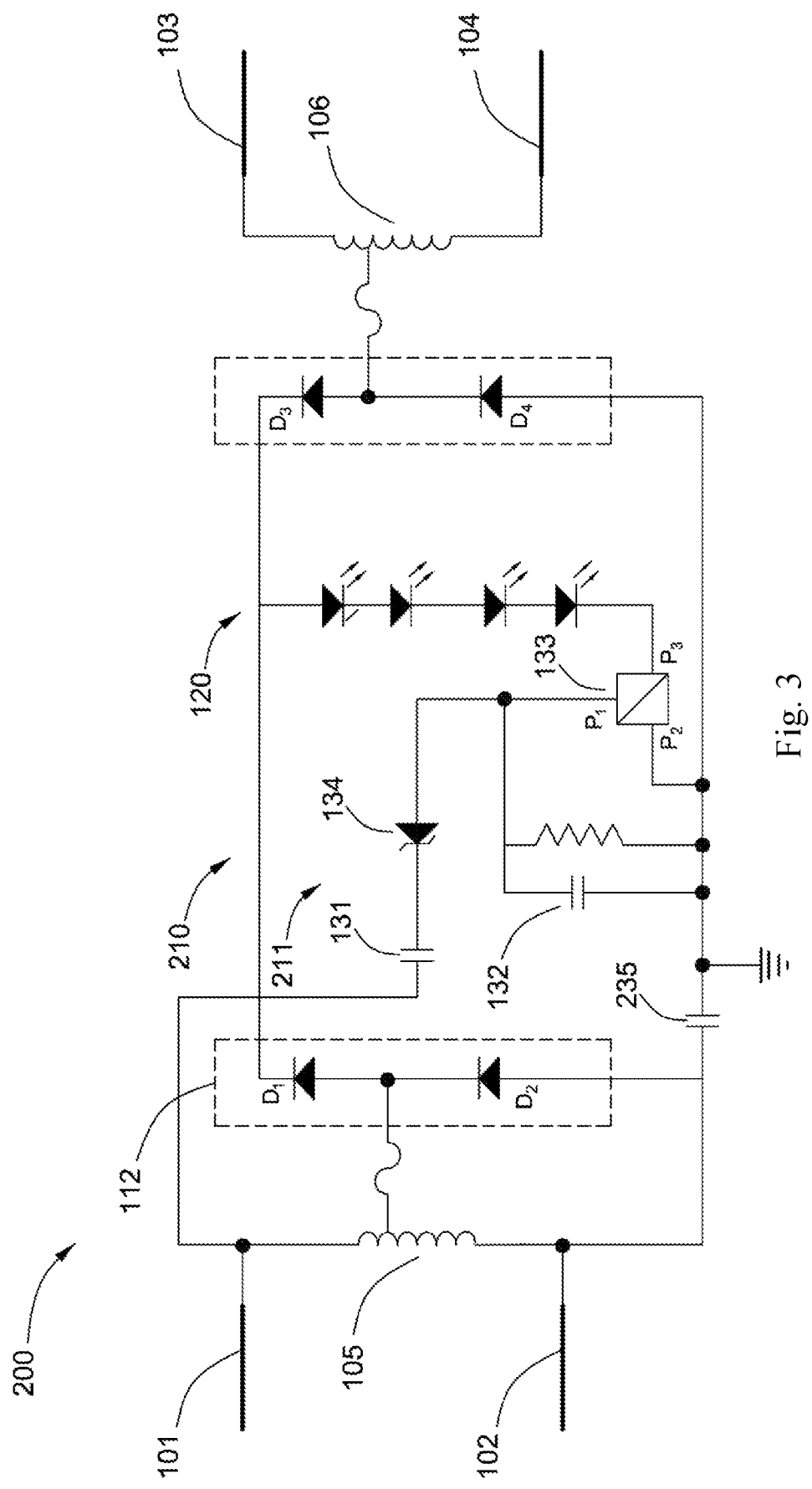
FIG. 3 is a schematic circuit diagram of a second embodiment of the LED lighting assembly of FIG. 1.

FIG. 3 is a schematic diagram showing the circuit structure of the LED lighting assembly 200 of the second embodiment of FIG. 1. Referring to FIG. 1 and FIG. 3, based on the LED lighting assembly 100 shown in FIG. 2, unlike the first embodiment, the switch control module 211 of the LED lighting assembly 200 of the second embodiment is connected to the side of the lamp tube between the two lamp pins, for receiving and processing the voltage signal, and controlling the driving of the LED 120 based on the processed voltage signal. Preferably, the switch control module 211 is coupled between the lamp pins 101 and 102, i.e., at both ends of the first impedance element 105, for receiving and processing the filament voltage signal. The switch control module 211 further comprises a fourth impedance element 235, wherein the $P_2$ terminal of the switch element 133 is connected to the lamp pin 102 through the fourth impedance element 235, and one end of the third impedance element 131 is connected to the lamp pin 101.

Figure 4:
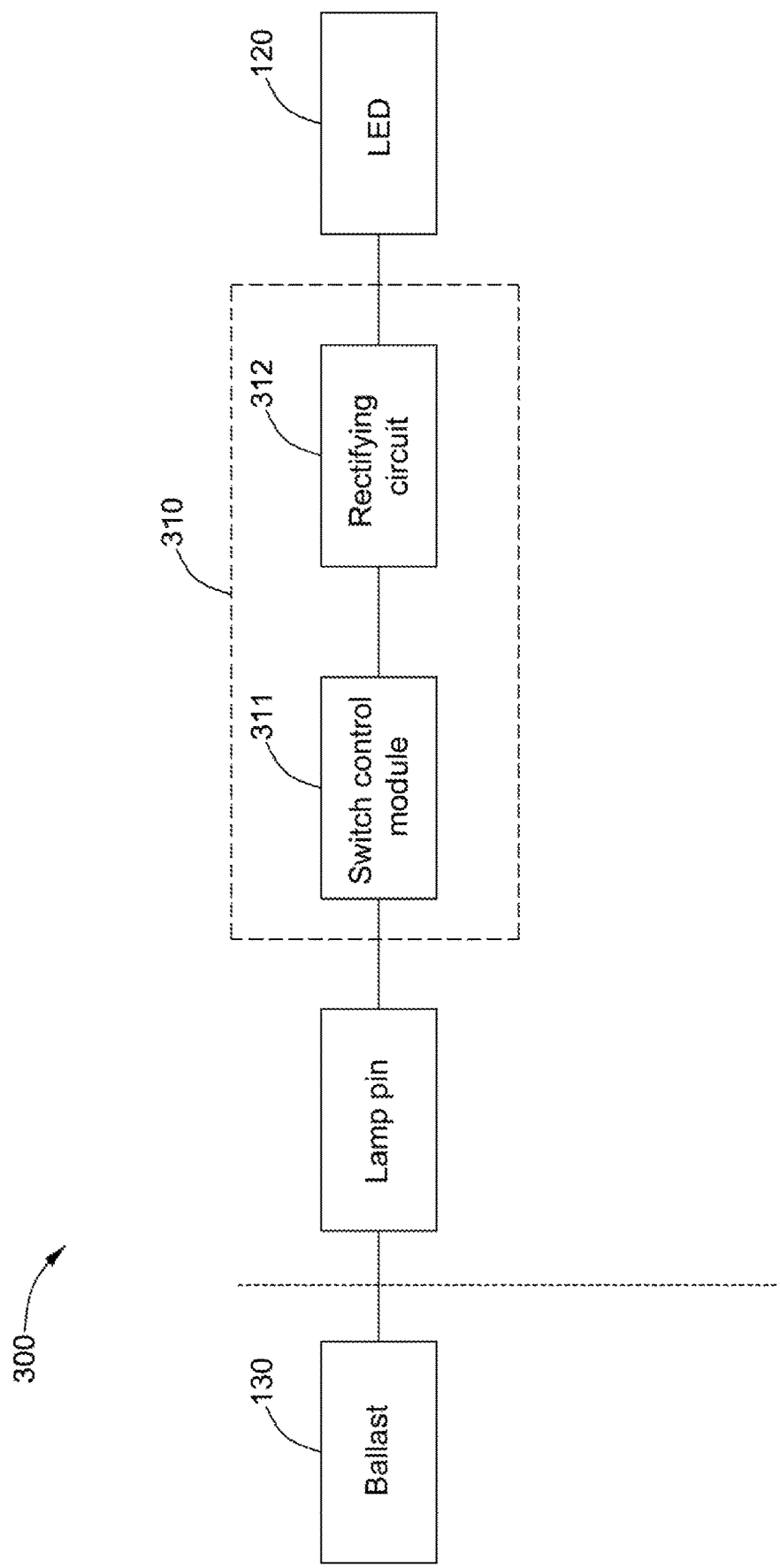
FIG. 4 is a general schematic block diagram of an LED lighting assembly according to a third embodiment of the present invention.
Figure 5:
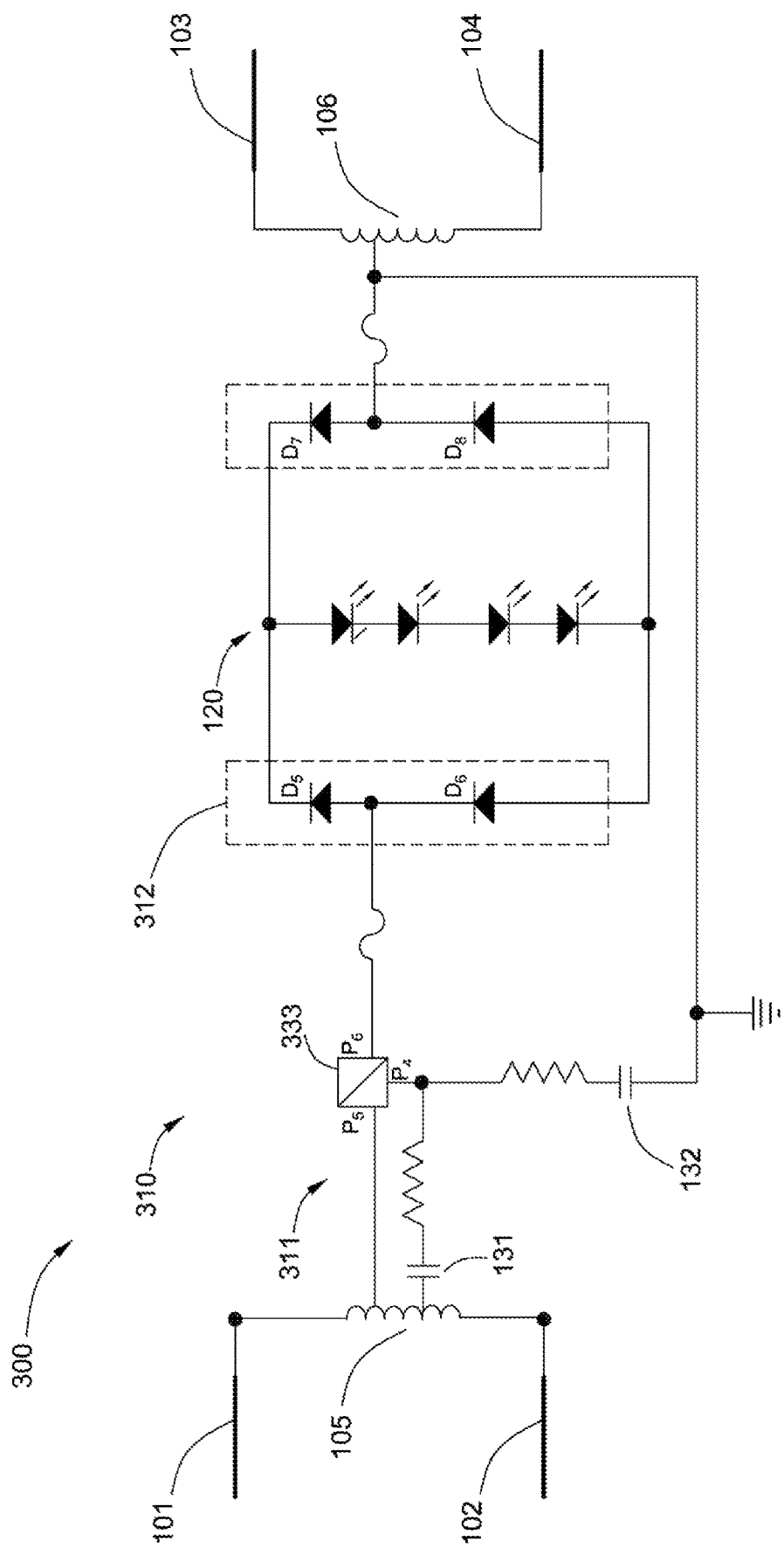
FIG. 5 is a schematic circuit diagram of the LED lighting assembly of FIG. 4.

FIG. 4 shows a general schematic block diagram of an LED lighting assembly 300 according to a third embodiment of the present invention, and FIG. 5 shows a circuit configuration diagram of the LED lighting assembly 300 of FIG. 4. Referring to FIGS. 4-5, based on the LED lighting assembly 100 shown in FIG. 1, unlike the first embodiment, the rectifying circuit 312 in the driving circuit 310 of the LED lighting assembly 300 of the third embodiment is connected between the switch control module 311 and the LED 120, the AC from the switch control module 311 is converted into DC and supplied to the LED 120, while the connection of the switch control module 311 in the LED lighting assembly 300 is different from the connection of the lighting assembly 100.

The rectifying circuit 312 comprises four diodes: $D_5$, $D_6$, $D_7$, and $D_8$. Wherein the junction between the anode of the diode $D_5$ and the cathode of the diode $D_6$ is connected to the switch element 333 of the switch control module 311; the junction between the anode of the diode $D_7$ and the cathode of the diode $D_8$ is connected to the second impedance element 106; the cathode of the diode $D_5$ and the cathode of the diode $D_7$ are connected to the positive terminal of the LED 120; the anode of the diode $D_6$ and the anode of the diode $D_8$ are connected to the negative terminal of the LED 120.

The switch control module 311 comprises a third impedance element 131, an integral element 132, and a switch element 333. The third impedance element 131 has one end connected to the first impedance element 105 and the other end connected to the $P_4$ terminal of the switch element 333. One end of the integral element 132 is connected to the $P_4$ terminal of the switch element 333, and the other end is connected to the second impedance element 106. The $P_5$ terminal of the switch element 333 is connected to the first impedance element 105, and the $P_6$ terminal is connected to the input terminal of the rectifying circuit 312. In one embodiment, switch element 333 comprises a bidirectional diode.

The LED lighting assembly 100/200/300 and the driving circuit thereof provided by the present invention can eliminate the need to remove the ballast when replacing the fluorescent tube, save cost, and are effectively compatible with the ballast, such that the LED may work as usual.

While the present invention has been described in detail with reference to specific embodiments thereof, it will be understood by those skilled in the art that many modifications and variations can be made in the present invention. It is, therefore, to be understood that the appended claims are intended to cover all such modifications and variations insofar as they are within the true spirit and scope of the invention.

The invention claimed is:

1. A LED lighting assembly configured to retrofit a fluorescent tube, comprising:
   at least one LED; and
   a driving circuit configured to drive the at least one LED, comprising:
   a switch control module connected to the at least one LED and configured to receive and process an alternating current voltage signal from one side or two sides of the LED lighting assembly and control to drive the at least one LED based on a processed voltage signal;
   a first impedance element disposed between first and second lamp pins on a first side of the LED lighting assembly;
   a second impedance element disposed between third and fourth lamp pins on a second side of the LED lighting assembly;
   a first rectifying circuit connected to the at least one LED and configured to convert a first alternating current power received from the first impedance element into a first direct current power provided to the at least one LED; and
   a second rectifying circuit connected to the at least one LED and configured to convert a second alternating current power received from the second impedance element into a second direct current power provided to the at least one LED.

2. An LED lighting assembly configured to retrofit a fluorescent tube lamp, comprising:
   at least one LED; and
   a driving circuit configured to drive at least one LED, comprising:
   a switch control module connected to the at least one LED and configured to receive and process an alternating current voltage signal form one side or two sides of the LED lighting assembly and control to drive the at least one LED based on a processed voltage signal, wherein the switch control module further comprises:
   at least one impedance element configured to receive the alternating current voltage signal and generate a pre-processed voltage signal;
   a switch element having a first threshold and connected to the at least one impedance element; and
   at least one integral element connected in parallel with the switch element, configured to integrating the pre-process voltage signal and provide the processed voltage signal to the switch element;
   wherein the switch element switches on and the control switch module drives the at least one LED when the processed voltage signal is larger than the first threshold; and
   a rectifying circuit connected to the at least one LED configured to convert an alternating current power inputted to the rectifying circuit into a direct current power provided to the at least one LED.

3. The LED lighting assembly according to claim 2, wherein the at least one impedance element comprises a resistance configured to reduce a voltage of the alternating current voltage signal and generate a reduced voltage signal, and the pre-processed voltage signal is the reduced voltage signal.

4. The LED lighting assembly according to claim 2, wherein the at least one impedance element comprises a capacitance or an inductance configured to pass a high frequency of the alternating current voltage signal and generate a high frequency voltage signal, and the pre-processed voltage signal is the high frequency voltage signal.

5. The LED lighting assembly according to claim 1, wherein the alternating current power inputted to the rectifying circuits comprises alternating current power from the two sides of the LED lighting assembly.

6. The LED lighting assembly according to claim 5, wherein the switch control module and the rectifying circuits are connected to two terminals of the at least one LED.

7. The LED lighting assembly according to claim 1, wherein the alternating current power inputted to the rectifying circuits comprises alternating current power from the switch control module.

8. The LED lighting assembly according to claim 7, wherein the rectifying circuits are connected between the switch control module and the at least one LED.

9. An LED driving circuit configured to retrofit a fluorescent tube lamp, comprising:
   a switch control module connected to at least one LED and configured to receive and process an alternating current voltage signal from two sides of a LED lighting assembly and control to drive the at least one LED based on a processed voltage signal;
   a first impedance element disposed between first and second lamp pins on a first side of the LED lighting assembly;
   a second impedance element disposed between third and fourth lamp pins on a second side of the LED lighting assembly;
   a first rectifying circuit connected to the at least one LED and configured to convert a first alternating current power received from the first empedance element into a first direct current power provided to the at least one LED; and
   a second rectifying circuit connected to the at least one LED and configured to convert a second alternating current power received from the second impedance element into a second direct current power provided to the at least one LED.

10. The LED driving circuit according to claim 9, wherein the switch control module further comprises:
    a switch element having a first threshold; and
    at least one integral element connected between the switch element and at least one of the first impedance element and the second impedance element, the at least one integral element being configured to integrate the pre-processed voltage signal and provide the processed voltage signal to the switch element;
    wherein the switch element switches on and the control switch module drives the at least one LED when the processed voltage signal is larger than the first threshold.

* * * * *